United States Patent [19]
Kumagai et al.

[11] Patent Number: 5,096,347
[45] Date of Patent: Mar. 17, 1992

[54] SPRING CLAMP WITH CLAMPED CONDITION HOLDING DEVICE

[75] Inventors: Fujio Kumagai, Mie; Keitaro Yonezawa, Kobe, both of Japan

[73] Assignees: Mori Seiko Co., Ltd., Nara; Kabushiki Kaisha Kosmek, Kobe, Japan

[21] Appl. No.: 679,472

[22] Filed: Apr. 2, 1991

[30] Foreign Application Priority Data

Apr. 20, 1990 [JP] Japan ................... 2-105667

[51] Int. Cl.$^5$ .................................... B23C 5/26
[52] U.S. Cl. ........................ 409/233; 408/239 A; 91/44; 92/183
[58] Field of Search ........... 409/233, 232, 231, 234; 408/239, 239 A, 240; 91/44; 92/28, 181 P, 183

[56] References Cited

U.S. PATENT DOCUMENTS

| | | | |
|---|---|---|---|
| 3,762,271 | 10/1973 | Poincenot | 409/233 |
| 3,875,848 | 4/1975 | Powell | 409/233 |
| 4,411,568 | 10/1983 | Röhm | 409/233 |
| 4,735,532 | 4/1988 | Hunt | 409/233 |
| 4,986,704 | 1/1991 | Narushima et al. | 409/233 |

FOREIGN PATENT DOCUMENTS 62-150035  9/1987  Japan ................... 409/233

Primary Examiner—Z. R. Bilinsky
Attorney, Agent, or Firm—Lowe, Price, LeBlanc & Becker

[57] ABSTRACT

An actuation member (B) supported by a housing (A) is actuated for clamping upwardly by means of a spring force and actuated downwardly for unclamping by means of an actuation means (D). A piston (11) is inserted into a cylinder (10) fixedly secured to the upper portion of the housing (A), and a liquid sealing chamber (12) is formed below the piston (11). The piston (11) is fixedly secured to the actuation member (B). When the actuation member (B) is held in the clamped condition, a liquid sealing valve (15) is closed so as to seal an oil (L) within the liquid sealing chamber (12). Whereby, in case that a pulling down force larger than the clamping spring force is imposed to the actuation member (B), a pressure generated within the liquid sealing chamber (12) serves to prevent the piston (11) from lowering, against the pulling down force.

15 Claims, 15 Drawing Sheets

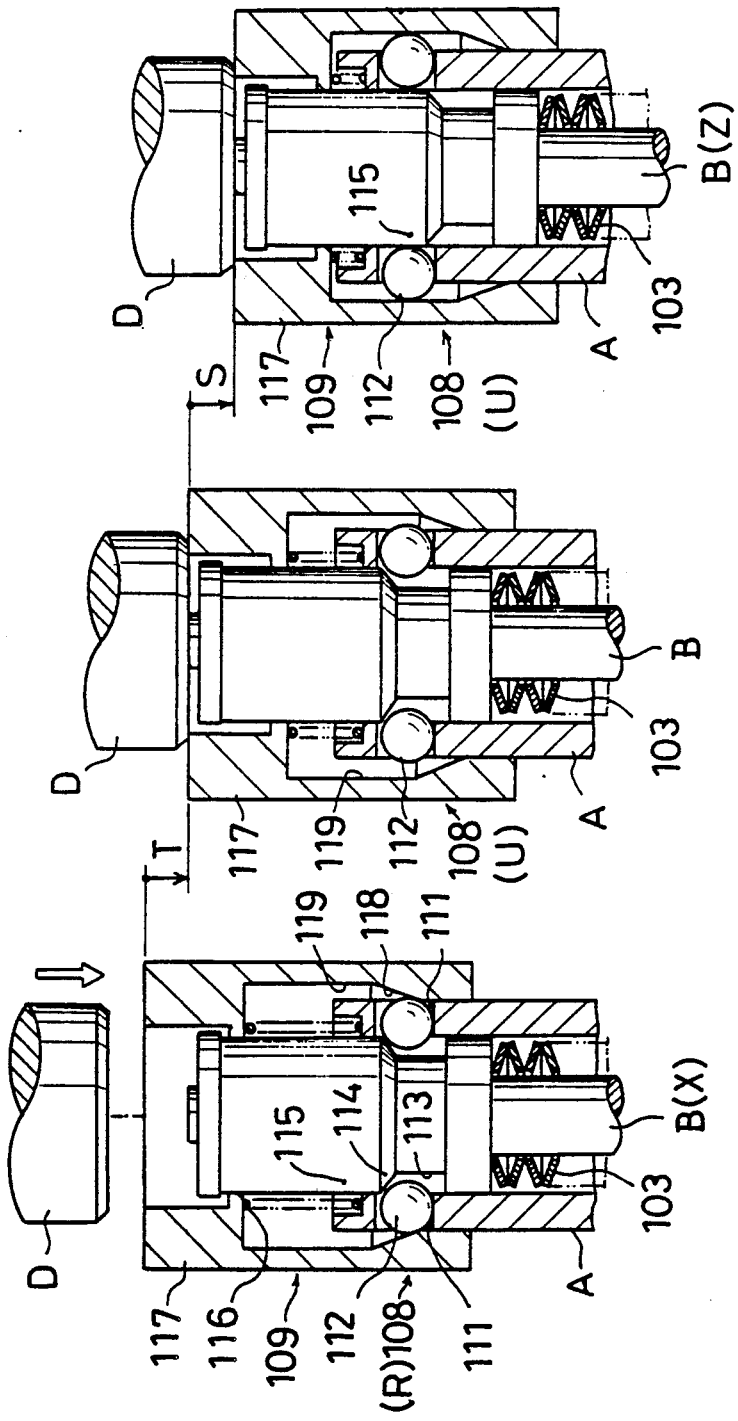

SPRING CLAMP WITH CLAMPED CONDITION HOLDING DEVICE

BACKGROUND OF THE INVENTION

1. Field of the Invention

The present invention relates to a clamp of the type adapted to fix, for example a tool holder to a spindle of a machining center by means of a spring force, and more specifically to a device for holding a fixed member (such as the tool holder and the like) under a clamped condition even in the case that an unclamping force larger than the spring force is imposed to the fixed member.

2. Description of Prior Art

As such a spring clamp known by the inventors of the present invention, there has been provided the one disclosed in the Japanese Utility Model Laid Open Publication No. 1987 -150035.

This clamp has the following basic construction as illustrated in FIG. 18.

As illustrated in FIG. 18(a), a clamping actuation member B is supported by means of a cylindrical housing A in a vertically movable manner. The clamping actuation member B has been actuated for clamping to an upper clamping position X by means of a clamping spring 103. To the contrary, as illustrated in FIG. 18(c), the clamping actuation member B has been lowered to a lower unclamping position Z by means of a pressing-down force exerted by an unclamping actuation means D against the clamping spring 103. Along the extent of the housing A and the actuation member B there are provided a clamped condition holding device 108 and a changeover device 109. The clamped condition holding device 108 is adapted to be changed over by means of the changeover device 109 between the locked condition R and the unlocked condition U. Under the locked condition R illustrated in FIG. 18(a), the actuation member B is held in the clamping position X, and to the contrary, its clamped condition is cancelled under the unlocked condition U illustrated in FIGS. 18(b) and 18(c).

In the above-mentioned basic construction, conventionally the clamped condition holding device 108 and the changeover device 109 are constructed as follows.

As illustrated in FIG. 18, the clamped condition holding device 108 includes steel balls 112 inserted into a plurality of guide ports 111 formed in the upper portion of the cylindrical wall of the housing A. The actuation member B is provided at its upper portion with a ball receiving groove 113, a ball butting portion 114 and a ball pushing out step-up portion 115 in order from below.

Then, the changeover device 109 comprises a changeover cylinder 117 resiliently urged upward with respect to the housing A by means of a return spring 116. The changeover cylinder 117 is provided at its inner surrounding surface with a ball pushing out tapered surface 118 and a ball retreating groove 119 in order from below.

The spring clamp having such conventional construction operates as follows.

Under the clamping condition illustrated in FIG. 18(a). the balls 112 are pushed inwardly by means of the pushing out tapered surface 118 of the changeover cylinder 117 and then butted against the butting portion 114, so that the clamped condition holding device 108 has been changed over to the locked condition R. Thereby, the actuation member B can be held in the clamping position X even though a pulling down force larger than a resilient force of the clamping spring 103 is imposed thereto.

At the time of unclamping, the changeover cylinder 117 is lowered by means of the unclamping actuation means D. Thereupon, firstly as illustrated in FIG. 18(b), as the changeover cylinder 117 is lowered by a locked condition cancellation stroke T, the balls 112 becomes so repositioned as to face the retreating groove 119 relative to the changeover cylinder 117. Thereby, as illustrated in FIG. 18(c), the balls 112 are pushed outwardly by means of the pushing out step-up portion 115, so that the clamped condition holding device 108 has become possible to be changed over to the unlocked condition U. Under this condition, the actuation means D acts to lower the actuation member B by an unclamping stroke S against the clamping spring 103 so as to change over the actuation member B to the unclamping position Z.

There are, however, the following problems associated with the above-mentioned prior art.

Since the balls 112 supports the butting portion 114 through a point contact respectively, an allowable butting force can't help becoming small. Therefore, a clamping capability of the clamped condition holding device 108 is small correspondingly.

Further, since the balls 112 are apt to be plastically deformed by a large surface pressure produced by the point contact, their smooth advancing and retreating movements within the guide ports 111 become obstructed soon. Therefore, the service life of the clamped condition holding device 108 is short.

Furthermore, since the locked condition cancellation stroke T is required to have a large distance substantially corresponding to the diameter of the ball 112, the stroke of the unclamping actuation means D becomes long. As a result, the operation time at the time of unclamping is long.

SUMMARY OF THE INVENTION

It is a first object of the present invention to enhance a clamped condition holding capability of a clamped condition holding device.

It is a second object of the present invention to prolong a service life of the clamped condition holding device.

It is a third object of the present invention to shorten an operation time at the time of unclamping.

For accomplishing the aforementioned objects, a clamped condition holding device and a changeover device are constructed as follows in the above basic construction.

The clamped condition holding device comprises a cylinder disposed in the vertically extending posture, a piston inserted into the cylinder under the liquid-tight and slidable condition and a liquid sealing chamber formed below the piston. The piston is connected to the clamping actuation member. A changeover device comprises a liquid supply/discharge chamber connected in communication to the aforementioned liquid sealing chamber, a liquid sealing valve interposed between both these chambers and an operating means serving to open and close the liquid sealing valve. The clamped condition holding device is changed over to the locked condition by closing the liquid sealing valve through the operating means so as to seal a liquid within the liquid sealing chamber, and the clamped condition holding device is changed over to the unlocked condition by opening the liquid sealing valve through the operating means so as to make the liquid sealing chamber connected in communication to the liquid supply-discharge chamber.

The present invention operates as follows.

Under the clamped condition, the actuation member has been resiliently urged by means of the clamping spring to be raised to the clamping position, the liquid sealing chamber has been sealed by means of the liquid sealing valve, and the clamped condition holding device has been changed over to the locked condition. When the pulling down force larger than the resilient force of the clamping spring is imposed to the actuation member under that clamped condition, the actuation member and the piston are going to be pulled down. Thereupon, the pressure of the liquid within the liquid sealing chamber increases to strongly prevent the piston from being pulled down and to hold the actuation member at the clamping position.

At the time of unclamping, under the above-mentioned clamped condition firstly the liquid sealing valve is opened so as to connect the liquid sealing chamber to the liquid supply/discharge chamber as well as to change over the clamped condition holding device to the unlocked condition. Subsequently, by means of a lowering actuation force of the unclamping actuation means, the actuation member is lowered by the unclamping stroke against the clamping spring so as to change over the actuation member to the unclamping position.

Since the present invention is constructed and operates as mentioned above, the following advantages can be provided.

Since the clamped condition holding device is adapted to receive the pulling down force of the actuation member through the piston by means of the liquid pressure within the liquid sealing chamber, it can surely provide an uniform and large pressure-supporting area and have a large clamped condition holding capability.

Further, since the clamped condition holding device is adapted to receive the aforementioned pulling down force by means of the liquid, a plastic deformation is not caused and the service life thereof is long.

Furthermore, since the clamped condition holding device merely opens the liquid sealing valve by means of the changeover device at the time of changeover from the locked condition to the unlocked condition, the locked condition cancellation stroke can be short or eliminated. As a result, the stroke of the unclamping actuation means becomes shorter as well as the operation time required for the unclamping can be shortened.

BRIEF DESCRIPTION OF THE DRAWINGS

The above and other objects, advantages and features of the invention will becomes apparent when considered with the following description and accompanying drawings:

FIG. 2 is a front view of a machining center;

FIG. 3 is a sectional view taken along the III—III directed line in FIG. 2;

FIG. 4 is a schematic view corresponding to FIG. 3;

FIG. 5 is a vertical sectional view illustrating the clamped condition;

FIG. 6 is a vertical sectional view illustrating the changeover transient condition;

FIG. 7 is a vertical sectional view illustrating the unclamped condition;

FIG. 8 is a partial enlarged view of FIG. 5, illustrating a low speed revolution state of a cylinder;

FIG. 9 is a view corresponding to FIG. 8, illustrating a high speed revolution state of the cylinder;

FIG. 14 is a view corresponding to FIG. 5;

FIG. 15 is a partial view illustrating a relief state;

FIGS. 18(a), (b), (c) illustrate a conventional embodiment and are views corresponding to FIGS. 5 through 7 respectively.

DESCRIPTION OF THE PREFERRED EMBODIMENTS

Figure 1:
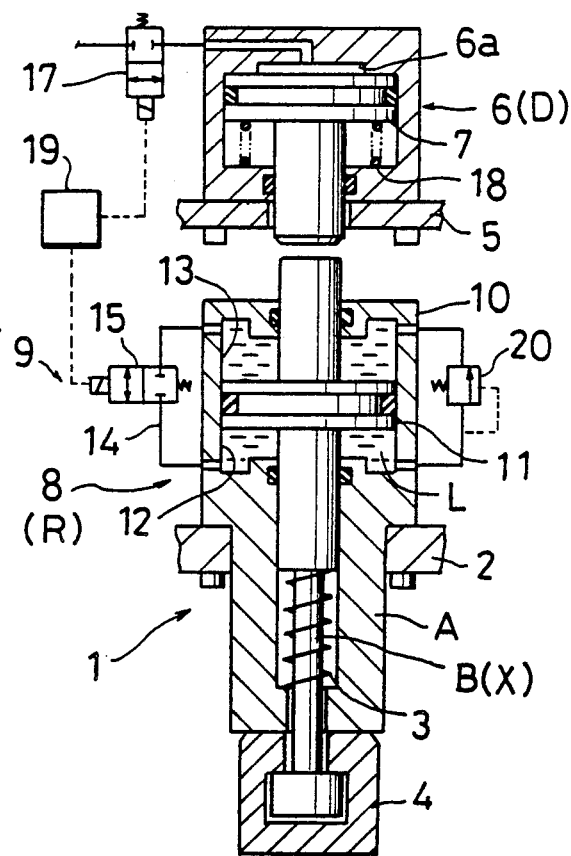
FIG. 1 is a system view illustrating an outline of a clamp according to the present invention.

Firstly an outline of a spring clamp will be explained with reference to a system view of FIG. 1.

A housing A of a spring clamp 1 is fixedly secured to a stationary support 2, and a rod-like actuation member B is internally fitted into the housing A so as to be vertically slidable. When the actuation member B is actuated to the clamping position X on the upper side (on the first end side) relative to the housing A by a resilient force of a clamping spring 3, a fixed member 4 is fixedly pressed to the lower portion of the housing A. To the contrary, when the actuation member B is actuated to the unclamping position on the on the lower side (on the second end side) against the clamping spring 3 by a pushing down force of a hydraulic piston 7 of a hydraulic cylinder 6 (an unclamping actuation means D) fixed to another stationary support 5, the fixed condition of the fixed member 4 is cancelled.

A clamped condition holding device 8 comprises a cylinder 10 fixedly secured onto the upper portion of the housing A and a piston 11 so fitted thereinto as to be liquid-tightly slidable in the vertical direction. A liquid sealing chamber 12 for generating a high pressure is formed below the piston 11. The piston 11 is fixedly secured to the actuation member B. A changeover device 9 comprises a low pressure liquid supply/discharge chamber 13 formed above the piston 11, a communication passage 14 adapted to connect the liquid supply/discharge chamber 13 to the aforementioned liquid sealing chamber 12 and a liquid sealing valve 15 ( herein, of the type being electromagnetically opened and closed) provided in the communication passage 14.

The aforementioned spring clamp 1 operates as follows.

When the fixed member 4 is going to be clamped, a pressurized oil within a hydraulic actuation chamber 6a of the hydraulic cylinder 6 is discharged from a pressurized oil supply/discharge valve 17 so that the hydraulic piston 7 can be raised by means of a return spring 18. Thereupon, the actuation member B is resiliently urged to the clamping position X by means of the clamping spring 3, so that the fixed member 4 is fixedly pressed.

Under the clamped condition, the liquid sealing valve 15 is closed by means of an operation means 19 (herein, of the type being electrically controlled) so that a liquid L is sealed within the liquid sealing chamber 12. Under the locked condition R of the clamped condition holding device 8, even though a pulling down force larger than the resilient force of the clamping spring 3 is imposed to the fixed member 4, a pressure of the liquid L within the liquid sealing chamber 12 is increased so as to prevent the piston 11 and the actuation member B from being lowered. Thereby, the actuation member B can be held in the clamping position X so that the fixed member 4 can be held under the clamped condition. Incidentally, in case that a pressure within the liquid sealing chamber 12 is abnormally increased by a temperature rise and the like, a relief valve 20 is adapted to operate for the safety sake.

On one hand, when the fixed member 4 is going to be unclamped, firstly the liquid sealing valve 15 is opened by means of the operation means 19 so as to connect the liquid sealing chamber 12 to the liquid supply/discharge chamber 13, so that the clamped condition holding device 8 is changed over to the unlocked condition. Under this condition, when the hydraulic piston 7 is lowered by supplying the pressurized oil from the pressurized oil supply/discharge valve 17 to the hydraulic actuation chamber 6a of the hydraulic cylinder 6, the piston 11 and the actuation member B are lowered against the clamping spring 3.

Incidentally, the liquid supply/discharge chamber 13 may be disposed also in a space outside the cylinder 10. The cylinder 10 may be fixedly secured to the stationary support 2 instead of to the housing A. Further, the actuation member B may be disposed on the outer peripheral side of the housing A instead that it is internally fitted into the housing A.

The liquid L contained within the liquid sealing chamber 12 and the liquid supply/discharge chamber 13 is preferably an oil. But it may be other fluidal liquids such as glycerol and so on.

First Embodiment

FIGS. 2 through 9 illustrate a first embodiment of the present invention and show such an example as employing the aforementioned spring clamp 1 in a tool locking device of a machining center. Incidentally, in this first embodiment, component parts having the same constructions as those in FIG. 1 are designated by the same symbols.

Figure 2:
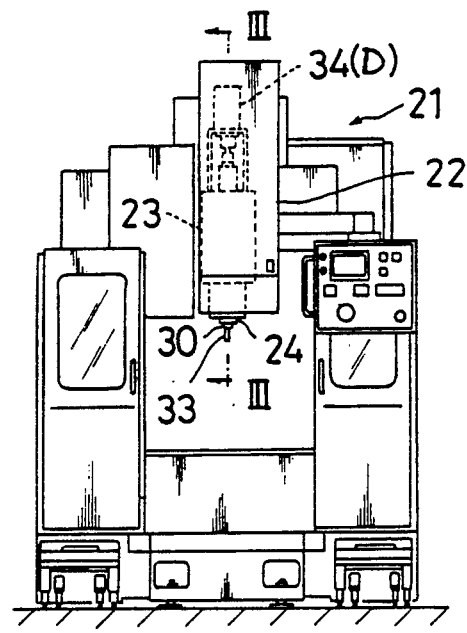
FIGS. 2 through 9 illustrate a first embodiment of the present invention.
Figure 4:
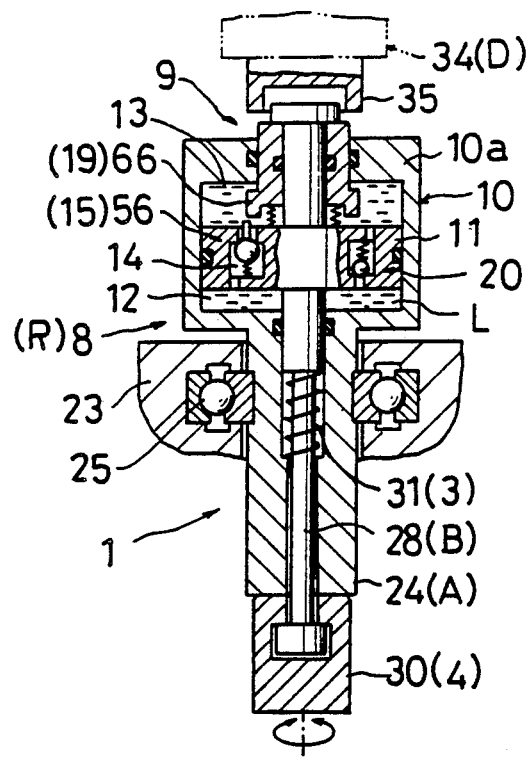
Figure 3:
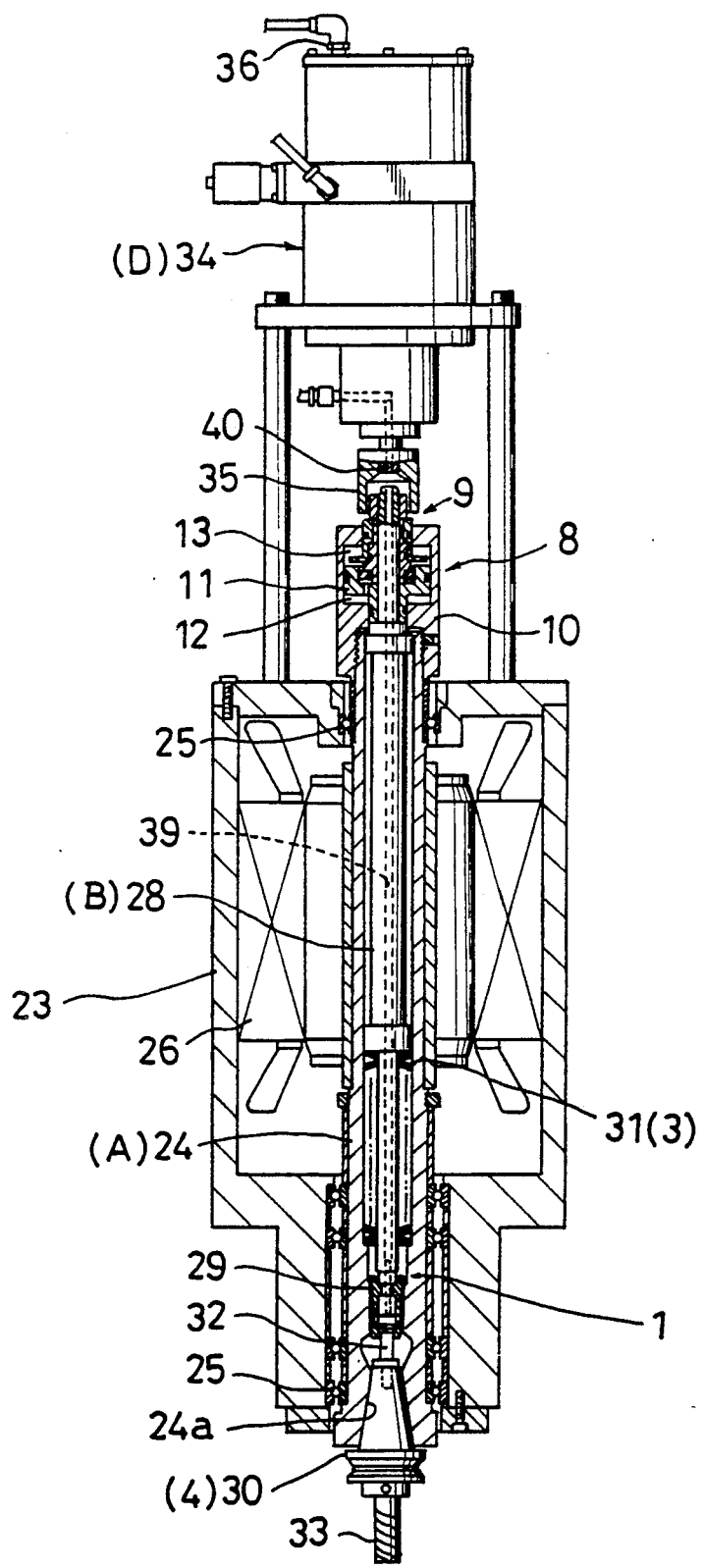

In FIGS. 2 through 4, within a casing 23 fixedly secured to a spindle head 22 of a vertical machining center 21, a spindle 24 as the housing A is rotatably supported by means of a plurality of bearings 25 and is adapted to be rotated at a high speed by means of a motor 26. A drawbar 28 as the actuation member B is internally fitted into the spindle 24 in a vertically slidable manner, and a collet 29 is connected to the lower portion of the drawbar 28.

When a tool holder 30 is going to be clamped to the spindle 24, the drawbar 28 is resiliently urged upwardly with respect to the spindle 24 by means of a plurality of coned disc springs 31 (clamping spring 3) as well as the collet 29 is contracted in diameter with being raised so that the tool holder 30 can be fixedly pressed to a holder receiving surface 24a of the spindle 24 through a pull-bolt 32. Incidentally, the symbol 33 designates a tool.

On the contrary, when the tool holder 30 is going to be unclamped, the drawbar 28 is lowered against the coned disc springs 31 by means of a pushing down force of an output portion 35 of a pneumatic hydraulic booster 34 as the unclamping actuation means D as well as the collet 29 is enlarged in diameter with being lowered so that the tool holder 30 is allowed to be pulled out.

The cylinder 10 of the clamped condition holding device 8 is fixedly secured to the upper portion of the spindle 24 through a threaded coupling means. The changeover device 9 is disposed in the inner space of the cylinder 10. Incidentally, in the pneumatic hydraulic booster 34, the symbol 36 designates a pressurized air supply nozzle. An air-blow passage 39 is formed in the drawbar 28 as a through-hole. The upper end portion of the passage 39 is adapted to be connected to an air supply port 40 formed in the output portion 35 of the booster 34.

Figure 5:
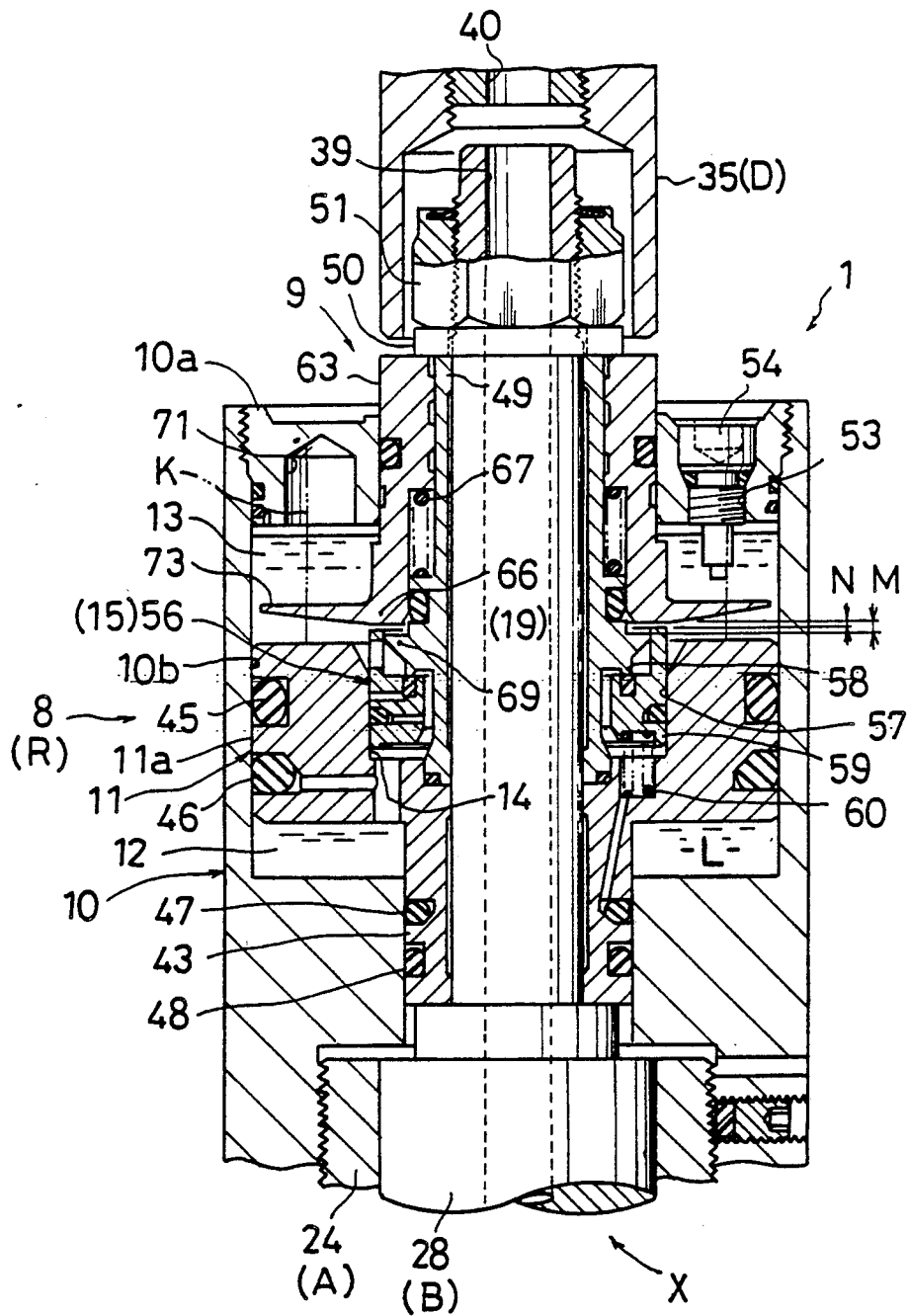
Figure 6:
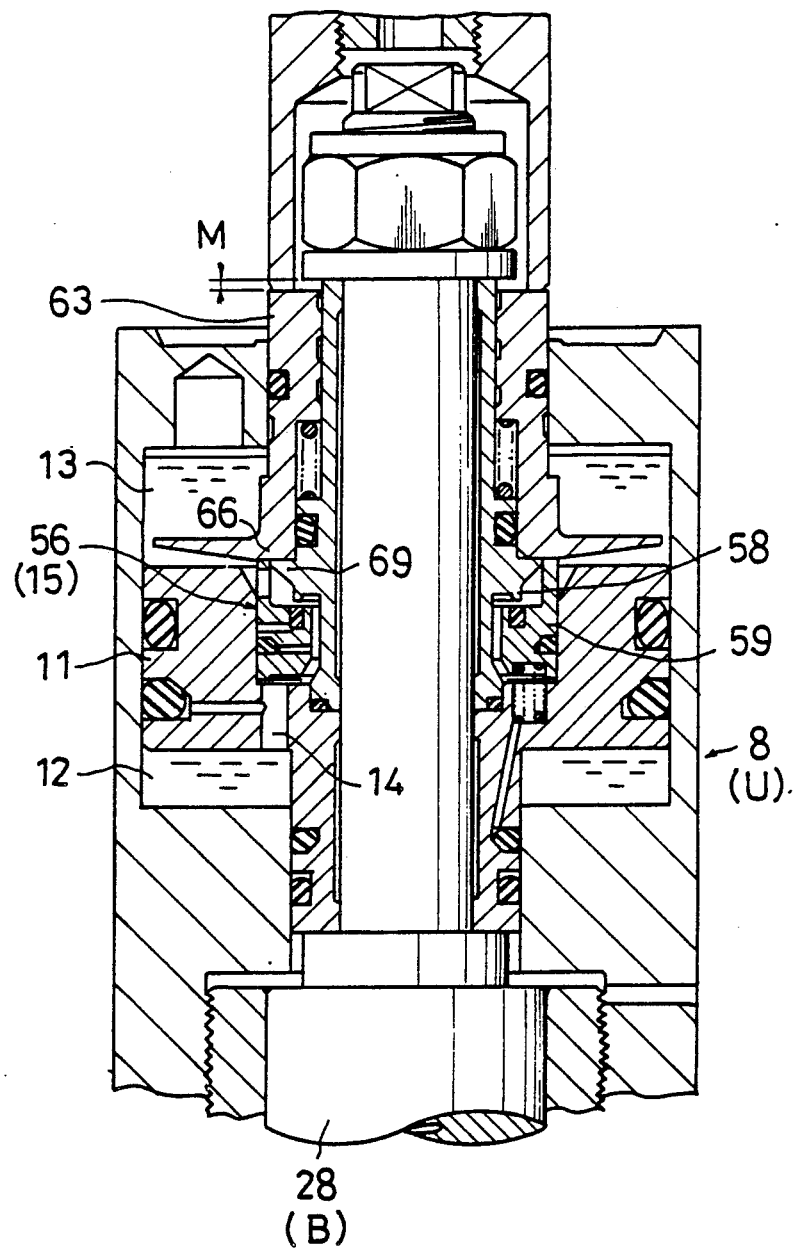
Figure 7:
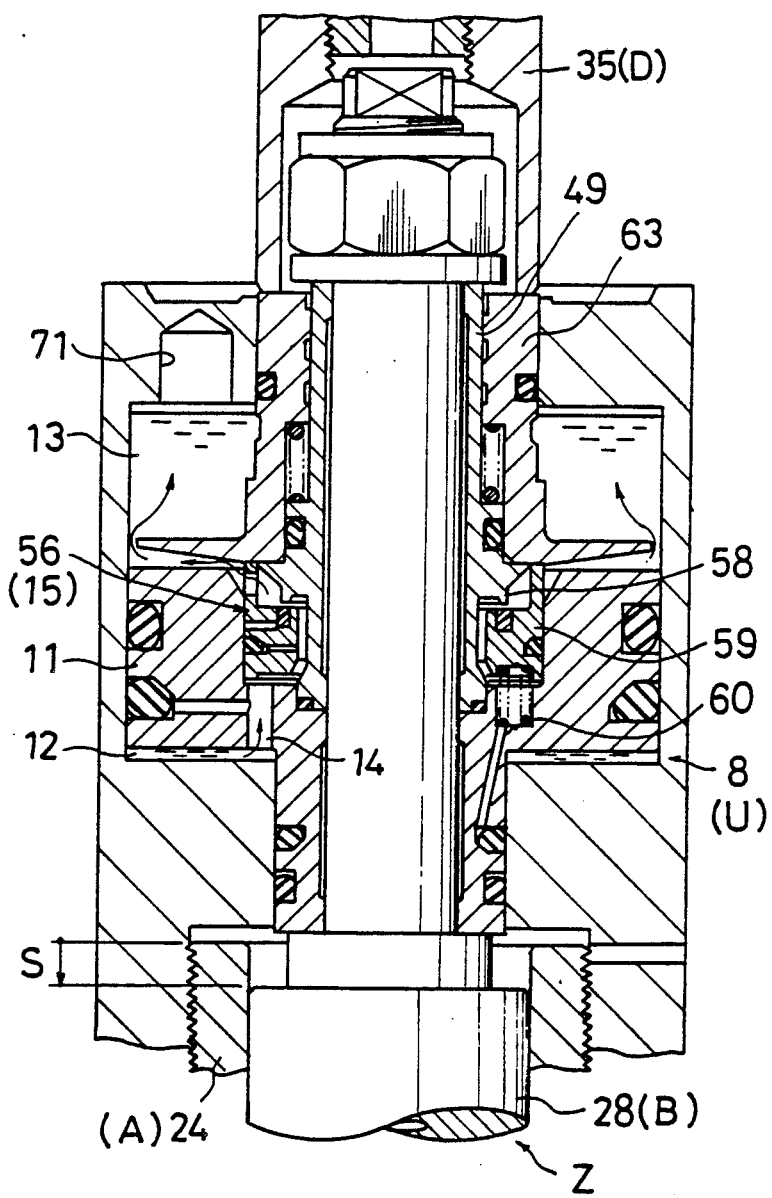

With reference to FIGS. 5 through 7, the clamped condition holding device 8 and the changeover device 9 will be explained concretely.

The clamped condition holding device 8 is constructed by liquid-tightly slidably inserting the cylindrical piston 11 and the cylindrical piston rod 43 into the cylinder 10 through upper and lower sealing members 45, 46 and 47, 48 respectively. The piston 11 and the piston rod 43 are fixedly secured to the drawbar 28 through a cylindrical pushing member 49, a washer 50 and a nut 51 in order. The liquid sealing chamber 12 is formed below the piston 11 (on the second end side), and the liquid supply/discharge chamber 13 is formed above the piston 11 (on the first end side). The liquid (an oil, herein) L is supplied to both those chambers 12, 13 from oil supply ports 53 formed in an upper wall (a first end wall) 10a of the cylinder 10. The oil supply ports 53 and their plugs 54 are disposed at a plurality of locations symmetrically with respect to the axis of the piston 11 so as to maintain a good revolution balance. The first sealing members 46, 47 provided nearer to the liquid sealing chamber 12, of the sealing members for the piston 11 and the piston rod 43 serve as a middle speed and high speed revolution sealing member, and the second sealing members 45, 48 remote from the liquid sealing chamber 12 serve as a low speed revolution sealing member or a sealing member for a revolution ceasing duration.

The changeover device 9 comprises a communication passage 14 so formed in the piston 11 as to connect both the upper and lower chambers 12, 13 in communication to each other and a check valve 56 (the liquid sealing valve 15) provided in the communication passage 14. That is, an annular check valve chamber 57 and an annular check valve seat 58 are provided in order from below within the annular passage 14 formed around the axis of the piston 11. The check valve seat 58 is so disposed at the mid way height portion of the pushing member 49 as to face downwardly. The check valve member 59 inserted into the check valve chamber 57 in the liquid-tightly and vertically slidable manner is resiliently urged onto the check valve seat 58 by means of a checking spring 60.

Then, a cylindrical unclamping input member 63 is externally fitted to the upper portion of the pushing member 49 so as to be liquid-tightly and vertically slidable with being passed through the upper wall 10a of the cylinder 10. The input member 63 is resiliently urged to a washer 50 by means of a return spring 67 so as to face the booster output portion 35. Further, a check valve opening member 66 as the operation means 19 is fixedly secured to the lower portion of the input member 63. The valve opening member 66 is adapted to be lowered against the return spring 67 by means of a pushing down force of the booster output portion 35, so that the check valve member 59 is separated from the check valve seat 58. An unclamping starting stroke M defined as a butting gap between the input member 63 and the unclamping input portion 69 formed at the mid way height portion of the pushing member 49 is set at a larger value than a valve opening starting stroke N defined as a butting gap between the valve opening member 66 and the check valve member 59.

Then, an oil storage cross-sectional area of the liquid supply/discharge chamber 13 is smaller than a cross-sectional area of the liquid sealing chamber 12 because the pushing member 49 and the input member 63 are installed within the straightly configured cylinder 10. But, liquid release chambers 71 are formed in the cylinder upper wall 10a to supplement a lack portion of the cross-sectional area. Also these liquid release chambers 71 are provided at a plurality of locations symmetrically with respect to the axis of the piston 11. Further, a disc-shaped partition wall 73 for preventing a mixing between gas (air) and liquid is protruded from the valve opening member 66 toward the inner peripheral surface 10b of the cylinder 10.

The above-mentioned spring clamp operates as follows.

Under the clamped condition illustrated in FIG. 5, the booster output portion 35 has been raised for return, the drawbar 28 has been resiliently urged upwardly to the clamping position X by means of the unillustrated coned disc springs 31 (refer to FIG. 3), and the unclamping input member 63 and the valve opening member 66 have been resiliently urged to the raised position by means of the return spring 67. Thereby, the check valve member 59 has been brought into contact with the check valve seat 58 by means of the checking spring 60, the oil L has been sealed within the liquid sealing chamber 12, and the clamped condition holding device 8 has been kept in the locked condition R.

Under the above-mentioned clamped condition, the spindle 24 is rotated at a high speed for applying a machining to a work piece. Herein, in case that machining conditions such as a feed speed, a revolution speed, a depth of cut and so on for a tool 33 (not illustrated herein) or in case that a cutting performance of the tool gets worse due to entanglement with chips during a pocket machining and the like, a pulling down force larger than the resilient force of the coned disc springs 31 is imposed to the tool 33 tending to pull down the drawbar 28 and the piston 11. Thereupon, the inner pressure of the liquid sealing chamber 12 increases to prevent the piston 11 from being pulled down so as to hold the drawbar 28 at the clamping position X. Thereby, the tool holder 30 can be strongly prevented from dropping out from a holder receiving surface 24a of the spindle 24.

Then, during the revolution of the spindle 24, as indicated by the alternate long and two short dashes line figure K in FIG. 5, the oil within the liquid supply/discharge chamber 13 is pushed against the peripheral wall of the cylinder 10 by means of the centrifugal force. But since the aforementioned partition wall 73 is adapted to prevent the upper space above the check valve member 59 from being connected in communication to the gas (air) phase portion, the air within the liquid supply/discharge chamber 13 can be prevented from being mixed with the oil L within the liquid sealing chamber 12. Thereby, it becomes possible to prevent the incompressibility of the oil L within the liquid sealing chamber 12 from being degraded so as to maintain the clamped condition holding capability well.

At the time of tool exchanging, after the revolution of the spindle 24 has been stopped under the clamped condition illustrated in FIG. 5, the changeover to the unclamped condition illustrated in FIG. 7 is carried out via the changeover transient condition illustrated in FIG. 6.

That is, under the clamped condition illustrated in FIG. 5, when the booster output portion 35 is lowered by actuating the unillustrated booster 34, the output portion 35 makes the input member 63 start lowering. Thereupon, first of all, the input member 63 is lowered by the butting gap N so as to be brought into contact with the check valve member 59 and then pushes down the check valve member 59 so as to separate it from the check valve seat 58 and to cancel the sealed state of the liquid sealing chamber 12. Then, the input member 63 is further lowered by the distance (M−N) so as to be brought into contact with the input portion 69, changing over the clamped condition holding device 8 to the unlocked condition U and resultantly it is changed over to the changeover transient condition illustrated in FIG. 6. Subsequently, by the lowering of the input member 63 caused by the booster output portion 35, as shown in the unclamped condition illustrated in FIG. 7, the oil L within the liquid sealing chamber 12 is released to the liquid supply/discharge chamber 13 through the communication passage 14 so as to allow the piston 11 to be lowered, so that the drawbar 28 lowers by the unclamping stroke S to be changed over to the unclamped position Z.

Incidentally, the changeover from the unclamped condition illustrated in FIG. 7 to the clamped condition illustrated in FIG. 5 is carried out according to the reversed procedure relative to the above-mentioned one.

According to the above-mentioned construction, since the liquid supply/discharge chamber 13 is formed in the upper space above the piston 11 as well as the communication passage 14 is formed in the interior of the piston 11, the changeover device 9 can be manufactured in compact size. Further, since the check valve member opening member 66 is fixedly secured to the lower portion of the unclamping input member 63, the liquid sealing construction can be simplified in comparison with that having both those members 63, 66 disposed individually as well as also such a construction as to raise and lower both those members 63, 66 sequentially can be simplified. Further, since the communication passage 14 and the check valve 56 are formed in the annular configurations, the clamped condition holding device 8 can make the changeover speed more rapid due to the large cross-sectional area of the oil supply/discharge flow passage as well as make also the revolution balance better.

Figure 8:
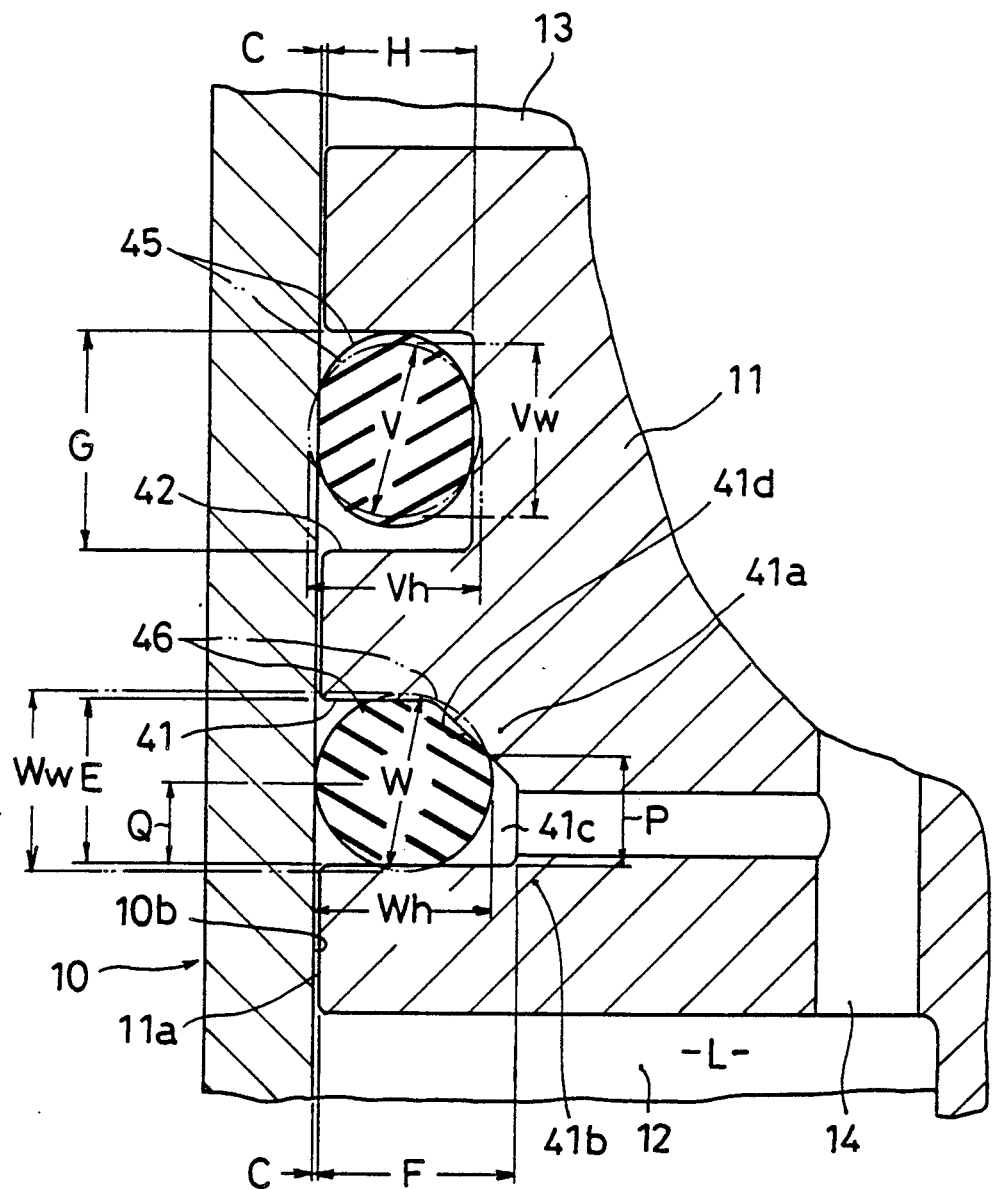
Figure 9:
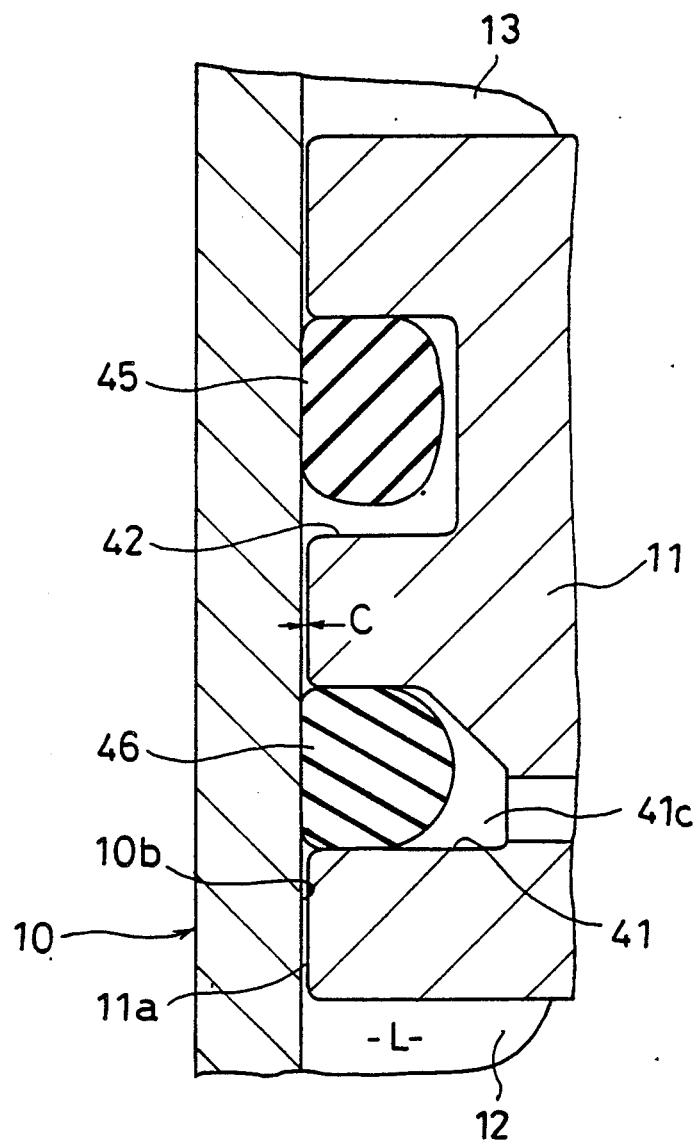

Next, the sealing construction of the outer peripheral surface 11a of the aforementioned piston 11 will be explained with reference to FIGS. 8 and 9. FIG. 8 illustrates such a condition that the spindle 24 of the machining center 21 is rotated at a low speed and also both the cylinder 10 and the piston 11 are rotating at a low speed about the axis. FIG. 9 illustrates such a condition that these cylinder 10 and the piston 11 are rotating at a high speed.

In FIG. 8, the first sealing member 46 composed of an O-ring having an original thickness W is installed within a first groove 41 formed in the outer peripheral surface 11a of the piston 11 so that a slide clearance C between the cylinder 10 and the piston 11 is sealed by means of the sealing member 46. A width dimension E of the first groove 41 is set at substantially the same value as a sealing width Ww of the sealing member 46 as well as a total dimension obtained by summing up a depth dimension F of the groove 41 and the slide clearance C is set at a larger value than a sealing height Wh of the sealing member 46. Incidentally, since the first sealing member 46 has a substantially circular cross section, the sealing width Ww and the sealing height Wh are equal to the original thickness W. A bottom space 41c of the groove 41 is connected in communication to the liquid sealing chamber 12 through the communication passage 14. Further, an upper (a first end side) one 41a of upper and lower fillets 41a, 41b of the groove 41 is enlarged so that the its pushing surface 41d projects toward the center of the groove 41. The pushing surface 41d is adapted to be brought into sealing contact with the upper portion of the outer peripheral surface of the sealing member 46 and to push the sealing member 46 toward the inner peripheral surface 10b of the cylinder 10.

Then, in the second groove 42 provided above the first groove 41, a second sealing member 45 composed of an O-ring having an original thickness V is installed. The second groove 42 is formed in a generally available shape. Its width dimension G is set at a larger value than a sealing width Vw of the second sealing member 45, and a total dimension obtained by summing up a depth dimension H and the slide clearance C is set at a smaller dimension than a sealing height Vh of the second sealing member 45. Incidentally, since also the second sealing member 45 has a substantially circular cross section, the sealing width Vw and the sealing height Vh are equal to the original thickness V.

Under the low speed revolution condition of the cylinder 10 or under the revolution ceased condition thereof, the above-mentioned respective sealing members 46, 45 serve as follows.

During the normal operation in which a pressure is not generated within the liquid sealing chamber 12, the first sealing member 46 is kept in resilient contact with the upper and lower walls of the first groove 41 and the inner peripheral surface 10b of the cylinder 10 as well as also the second sealing member 45 is kept in resilient contact with the upper and bottom walls and the inner peripheral surface 10b of the cylinder 10, so that the slide clearance C can be sealed.

When the aforementioned pulling down force is imposed to the piston 11 and thus the pressure of the oil L within the liquid sealing chamber 12 is increased, the increased pressure acts to a bottom space 41c of the first groove 41 through the communication passage 14. Thereby, the first sealing member 46 is pushed to the inner peripheral surface 10b of the cylinder 10 by means of a differential pressure corresponding to a difference between the inside pressure receiving width P and the outside pressure receiving width Q so as to seal the slide clearance C. Incidentally, in case that a pressurized oil is leaked to the upper side above the first sealing member 46 by any reason, the leaked pressurized oil is sealed by the second sealing member 45. In this case, though the pressurized oil is confined between both those sealing members 46, 45, the sliding movement of the piston 11 is not blocked thereby at the time of pressure releasing operation for the liquid sealing chamber 12 because the the first sealing member 46 is pushed toward the right and down direction by means of the confined pressurized oil and then the sealing surface between the the first sealing member 46 and the inner peripheral surface 10b of the cylinder 10 is automatically opened.

As illustrated in FIG. 9, under such a condition that the cylinder 10 and the piston 11 rotate at a high speed, since a strong centrifugal force acts on the respective sealing members 45, 46, the upper second sealing member 45 tends to be separated from the bottom wall of the second groove 42. Therefore, it is apprehended that the upward leakage of the pressurized oil L within the liquid sealing chamber 12 from between the upper wall of the second groove 42 and the second sealing member 45 can not be prevented by means of only the second sealing member 45. To the contrary, the lower first sealing member 46 is strongly pushed to the inner peripheral surface 10b of the cylinder 10 by the aforementioned centrifugal force so as to be swelled out upwardly and downwardly and then strongly brought into sealing contact with the upper and lower walls of the first groove 41. Therefore, the pressurized oil L within the liquid sealing chamber 12 can be prevented from leaking out upwardly. Accordingly, even under the high speed condition, the interior of the liquid sealing chamber 12 can be maintained at a high pressure so that the clamped condition holding capability can be maintained well.

Further, in the case that the first sealing member 46 is swelled due to its secular degeneration and the like, the swelled portion can be received within the bottom space 41c of the first groove 41 so that the sealing member 46 can be prevented from swelling out into the slide clearance C. Accordingly, also its sealing service life becomes elongated.

Incidentally, though the width dimension E of the first groove 41 may be a little larger than the sealing width Ww of the first sealing member 46 without any interference, it is preferably equal to or a little smaller than the sealing width Ww.

Further, as illustrated in FIG. 5, also the sealing portion between the piston rod 43 and the cylinder 10, the sealing portion between the piston 11 and the check valve member 59 and the like are constructed similarly to those of the first groove 41 and the the first sealing member 46.

In the case that the spring clamp 1 is applied to the tool locking device of the machining center 21, the housing A is constructed by the spindle 24 and the actuation member B is constructed by the drawbar 28 as mentioned above, the following advantages can be provided. That is, when the clamped condition holding capability is intended to be increased, it is enough that the drawbar 28 is only connected to the piston 11 of the clamped condition holding device 8. Thereupon, it is unnecessary to modify the spindle 24 of the machining center 21, the clamping spring 3 and the unclamping actuation means D. Therefore, it becomes easy to newly provide the clamped condition holding device 8 in the machining center 21 already installed and to modify the clamped condition holding device having the conventional construction according to the clamped condition holding device 8 of the present invention, Incidentally, of course the present invention may be applied not only to the machining center but also to other machine tools.

Figure 10:
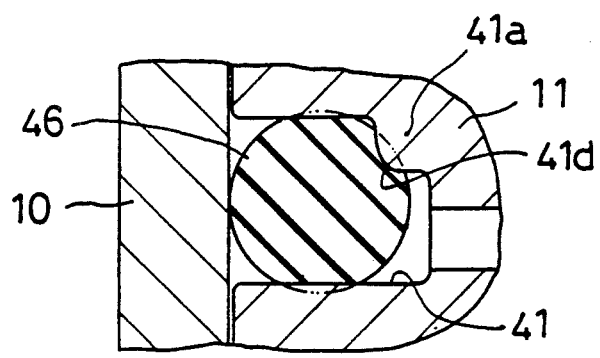
FIGS. 10, 11 and 12 illustrate variants respectively and partial views corresponding to FIG. 8.
Figure 11:
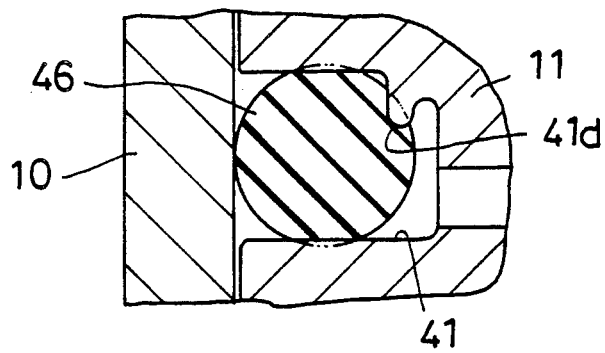
Figure 12:
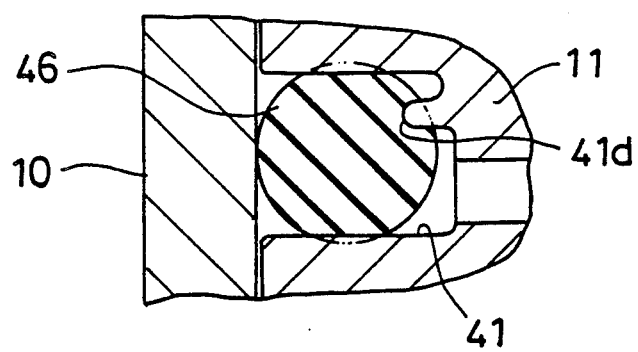

FIGS. 10 through 12 illustrate a first through a third variants respectively and are partial views corresponding to FIG. 8. In the respective variants, component members having the same functions as those illustrated in FIG. 8 are designated by the same symbols.

In the first variant illustrated in FIG. 10, the pushing surface 41d of the upper fillet 41a is curved at substantially a right angle.

In the second variant illustrated in FIG. 11, the aforementioned pushing surface 41d is curved in the U-shape.

In the third variant illustrated in FIG. 12, the aforementioned pushing surface 41d is curved in the horizontally turned U-shaped.

FIGS. 13 through 17 illustrate a second through a fifth embodiments. In these embodiments, component members having the same functions as those of the above-mentioned first embodiment are as a general rule designated by the same symbols.

Second Embodiment

Figure 13:
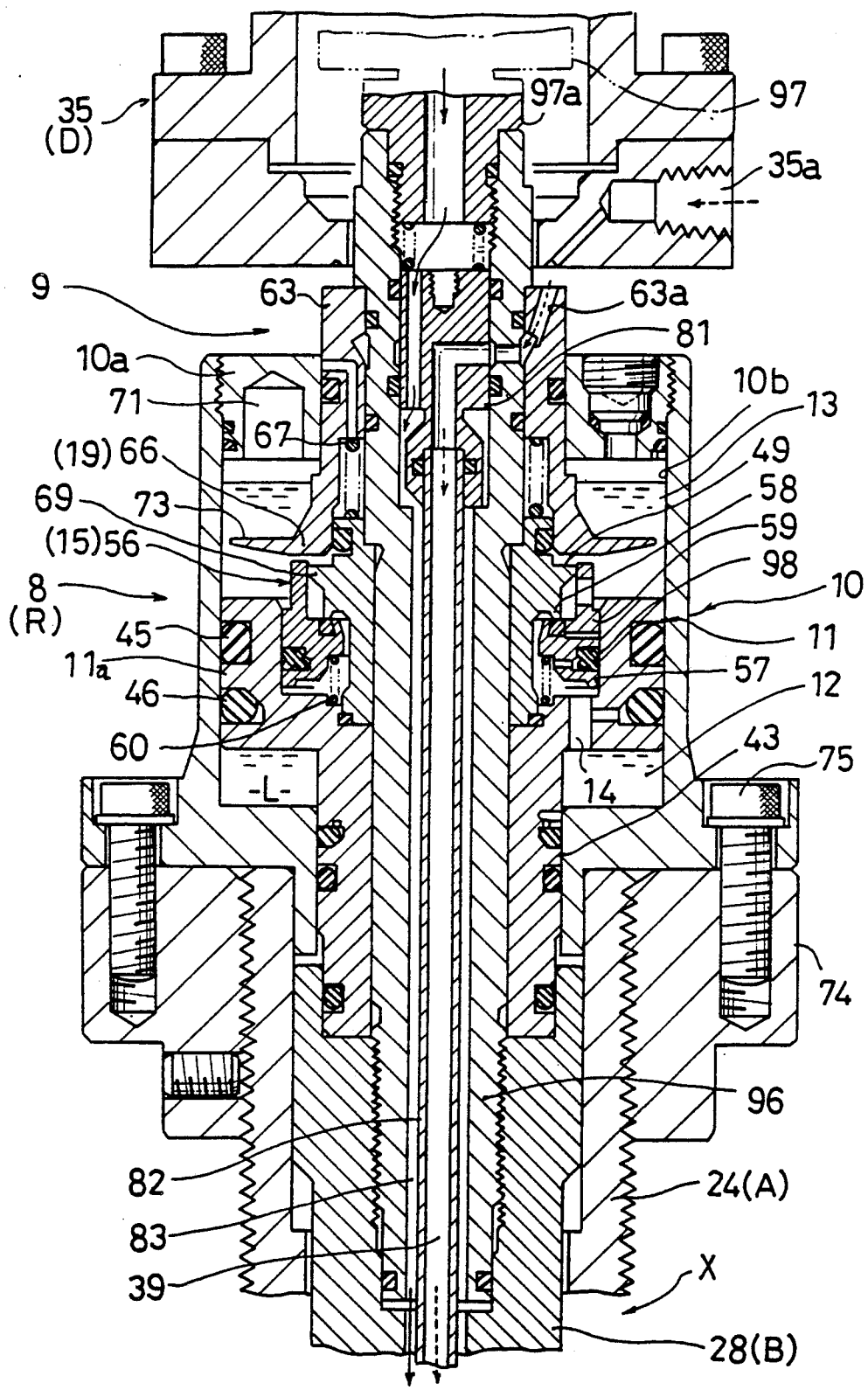
FIG. 13 illustrates a second embodiment of the present invention and are views corresponding to FIG. 5.

FIG. 13 illustrates the clamped condition holding device 8 as the second embodiment applicable to a relatively large machining center.

The lower portion of the cylinder 10 is fixedly secured to an upper flange 74 of the spindle 24 by means of a plurality of bolts 75. A tubular bolt 96 is inserted into both through-holes of the piston 11 and the piston rod 43. By threadably securing the lower end portion of the bolt 96 to the upper portion of the drawbar 28, the piston 11 and the piston rod 43 are fixedly secured between the tubular pushing member 49 and the drawbar 28.

A rotor 97a of a rotary coupling 97 for supplying a cutting liquid is fixedly secured to the upper portion of the tubular bolt 96. During the cutting operation of the machining center, the cutting liquid supplied under pressure to the rotary coupling 97 flows through a delivery metal fitting 81 disposed within the upper portion of the bolt 96 and an annular liquid passage 83 outside a center pipe 82 in order as indicated by the directed solid line to be supplied to the tool 33 (refer to FIG. 3). Thereby, it becomes possible to strongly cool the tool 33 when a deep hole cutting and a heavy load cutting are carried out.

Further, at the time of unclamping operation, a pressurized air supplied to the air supply port 35a of the booster output portion 35 after the output portion 35 has been brought into contact with the unclamping input member 63 flows downwardly from the receiving port 63a of the input member 63 through the delivery metal fitting 81 and the air blow flow passage 39 within the pipe 82 in order as indicated by the directed broken line, so that the aforementioned holder receiving surface 24a (refer to FIG. 3) can be cleaned.

Then, the fitting gap between the check valve member 59 of the check valve 56 and the piston 11 is sealed by means of a X-ring 98. A dimensional relation between the X-ring 98 and a X-ring installation groove is substantially the same as that between the first sealing member 46 and the first groove 41 illustrated in FIG. 8.

Third Embodiment

Figure 14:
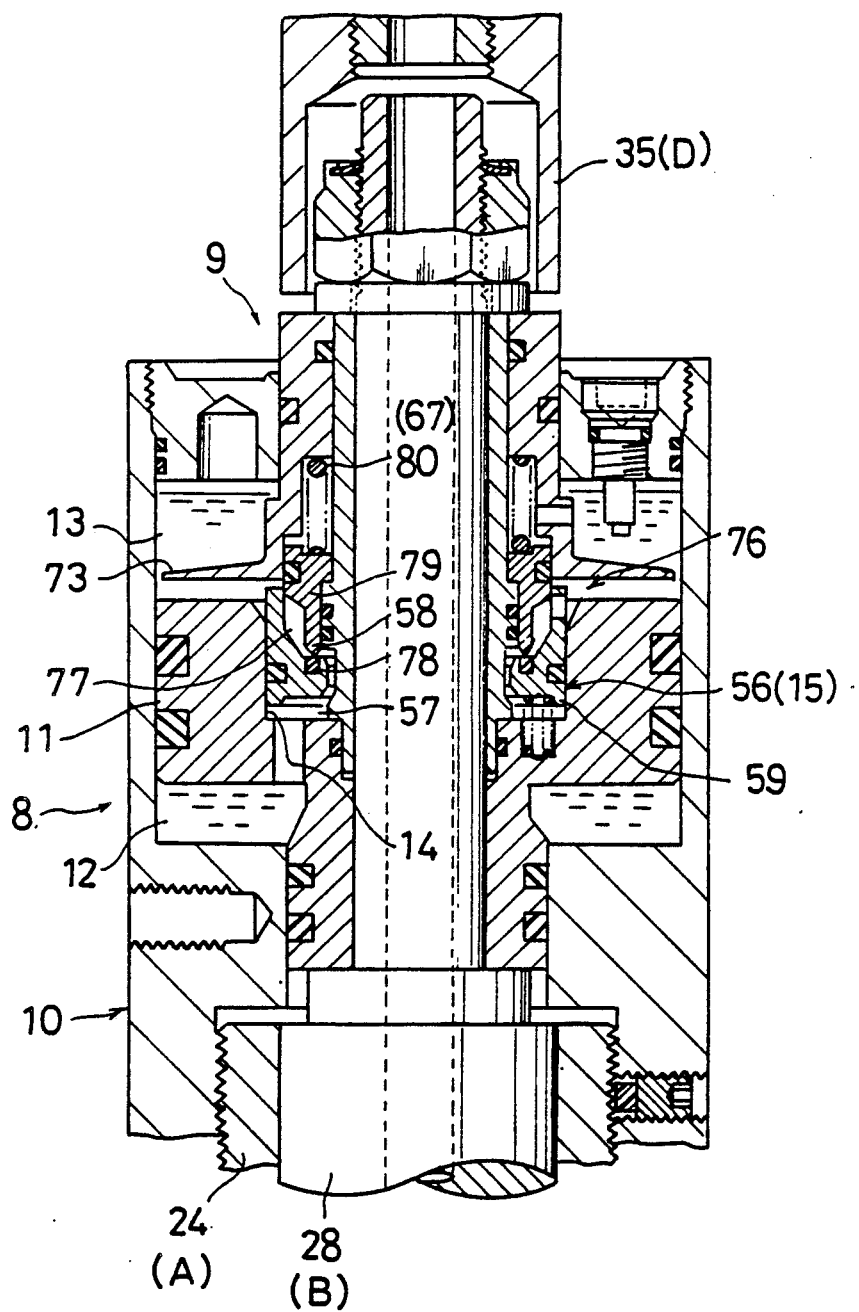
FIGS. 14 and 15 illustrate a third embodiment of the present invention.
Figure 15:
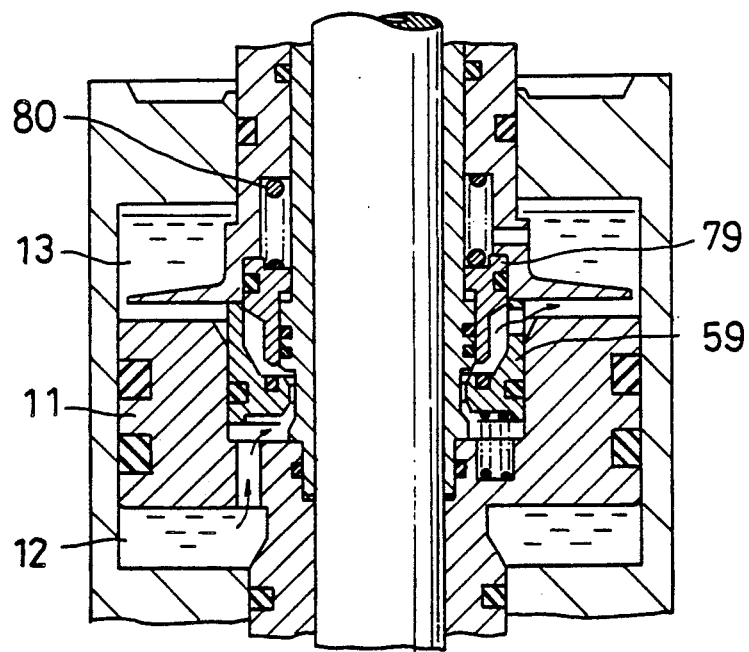

FIGS. 14 and 15 illustrated a third embodiment.

As illustrated in FIG. 14, a relief valve 76 is arranged in series in the space above the check valve 56 within the communication passage 14. That is, a relief valve chamber 77 is arranged in series above the check valve chamber 57, and the check valve seat 58 is formed in the lower portion of a relief valve member 79 inserted into the relief valve chamber 77 as well as a relief valve seat 78 is formed in the check valve member 59. The relief valve member 79 is resiliently urged for valve closing onto the relief valve seat 78 by means of a relief spring 80 serving also as the return spring 67.

In case that the pressure within the liquid sealing chamber 12 is excessively increased by a raised temperature of the cylinder 10 receiving a heat from the spindle 24, as illustrated in FIG. 15, the relief valve member 79 is separated from the check valve member 59 by means of that abnormal pressure against the relief spring 80 so as to release the abnormal pressure within the liquid sealing chamber 12 into the liquid supply/discharge chamber 13.

Fourth Embodiment

Figure 16:
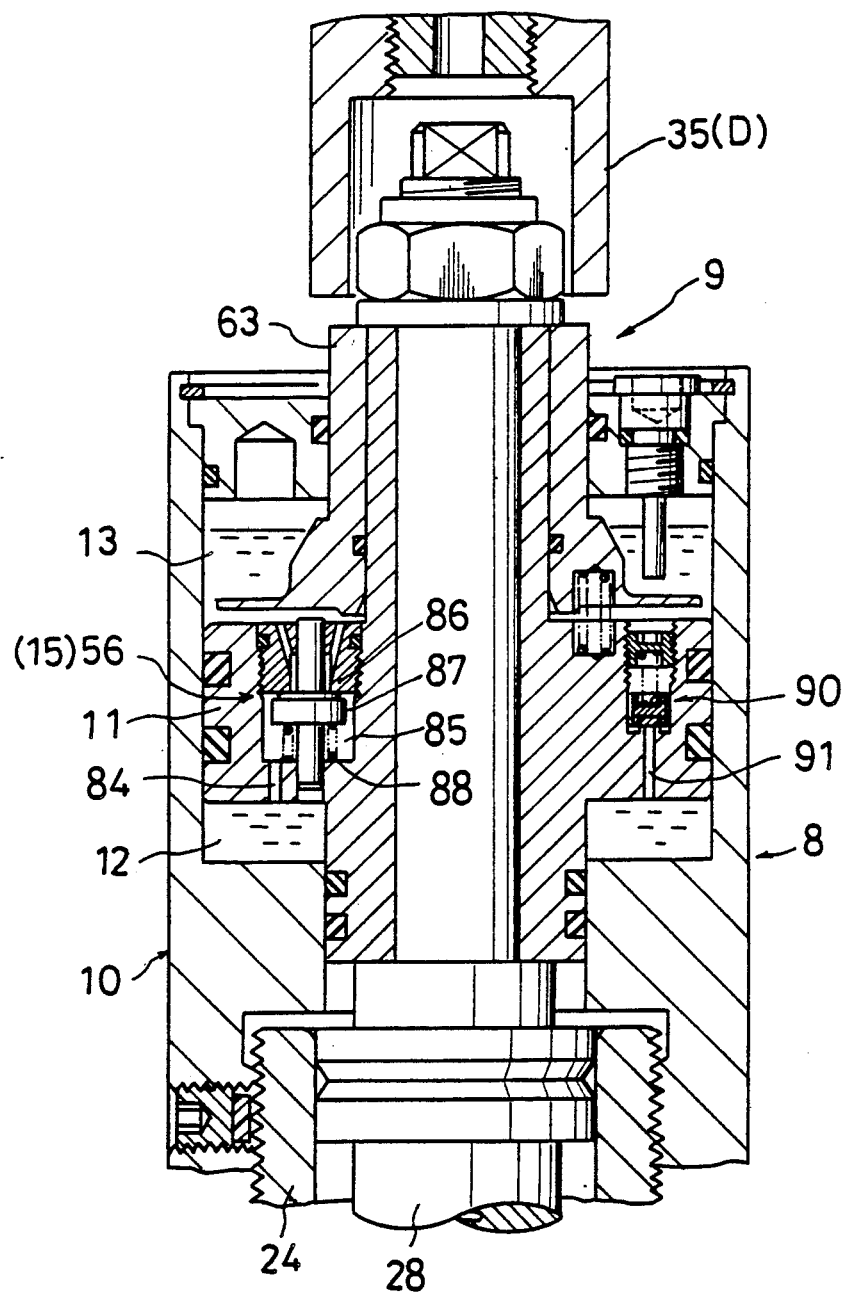
FIG. 16 illustrates a fourth embodiment of the present invention and is a view corresponding to FIG. 5.

FIG. 16 illustrates a fourth embodiment.

A plurality of communication passages 84 are formed as through-holes in the piston 11 symmetrically with respect to the axis of the piston 11. The check valve chamber 85 and the check valve seat 86 are formed in each of the communication passages 84 in order from below. The check valve member 87 within the check valve chamber 85 is resiliently urged for valve closing onto the check valve seat 86 by means of the check valve spring 88, and a projected upper portion of the check valve member 87 is so disposed as to face the unclamping input member 63. A plurality of relief valves 90 are arranged in another communication passage 91 formed in the piston 11 symmetrically with respect to the piston axis.

Fifth Embodiment

Figure 17:
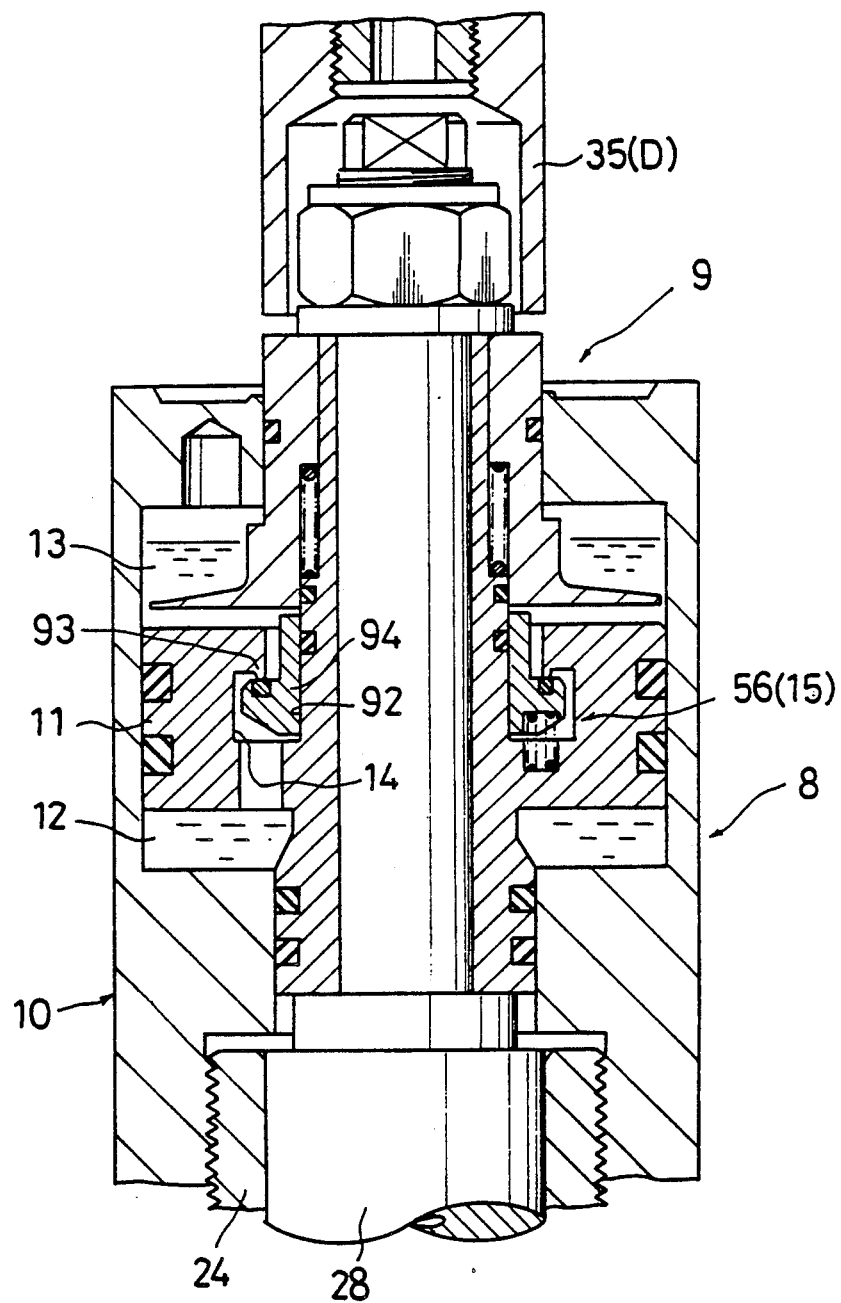
FIG. 17 illustrates a fifth embodiment of the present invention and is a view corresponding to FIG. 5.

FIG. 17 illustrates a fifth embodiment.

The check valve member 94 is supported vertically slidably by the inner peripheral surface of the annular passage 14 within a check valve chamber 92. Further, a check valve seat 93 is formed integratedly with the piston 11.

It will be apparent that, although a specific embodiment and certain modifications of the present invention have been described in detail, the invention is not limited to the specifically illustrated and described constructions since variations may be made without departing from the principles of the invention.

What is claimed is:

1. A spring clamp with a clamped condition holding device comprising:
   a housing (A) having an axis;
   a clamping actuation member (B) having a first end and a second end and being supported by said housing (A) in a movable manner in the direction of said axis;
   a clamping spring (3) adapted to urge said actuation member (B) to a clamping position (X) on the side of said first end;
   an unclamping actuation means (D) adapted to actuate said actuation member (B) to an unclamping position (Z) on the side of said second end against said clamping spring (3);
   a clamped condition holding device (8) adapted to change over between such a locked condition (R) as to hold said actuation member (B) in the clamping position (X) and such an unlocked condition (U) as to cancel the holding, said clamped condition holding device (8) being provided with a cylinder (10) extending in the direction of said axis, a piston (11) liquid-tightly slidably inserted into said cylinder (10) and a liquid sealing chamber (12) formed on the second end side of said piston (11), said piston (11) being connected to said actuation member (B);

a changeover device (9) adapted to change over said clamped condition holding device (8) between said locked condition (R) and said unlocked condition (U), said changeover device (9) being provided with a liquid supply/discharge chamber (13) connected in communication to said liquid sealing chamber (12), a liquid sealing valve (15) interposed between both these chambers (12) (13) and an operation means (19) adapted to open and close said liquid sealing valve (15);

wherein, when said liquid sealing valve (15) is so closed by means of said operation means (19) as to seal a liquid (L) within said liquid sealing chamber (12), said clamped condition holding device (8) being changed over to the locked condition (R), and when said liquid sealing valve (15) is so opened by means of said operation means (19) as to connect said liquid sealing chamber (12) to said liquid supply/discharge chamber (13), said clamped condition holding device (8) being changed over to the unlocked condition (U).

2. A spring clamp as set forth in claim 1, wherein said liquid supply/discharge chamber (13) is formed on the first end side of the piston (11) within the cylinder (10).

3. A spring clamp as set forth in claim 2, wherein a cross-sectional area of said liquid supply/discharge chamber (13) is formed smaller than that of said liquid sealing chamber (12), and a liquid release chamber (71) is formed in a first end wall (10a) of the cylinder (10).

4. A spring clamp as set forth in claim 2, wherein said liquid sealing valve (15) is composed of a check valve (56), a communication passage (14) for connecting said liquid sealing chamber (12) and said liquid supply/discharge chamber (13) to each other is formed in the piston (11), a check valve chamber (57) and a check valve seat (58) are formed in said communication passage (14) in order from the second end side, and a check valve member (59) inserted into said check valve chamber (57) is resiliently urged onto the check valve seat (58) by means of a checking spring (60), said operation means (19) comprises a check valve opening member (66) facing said check valve member (59) from the first end side and a return spring (67) resiliently urging said valve opening member (66) toward the first end side, and said unclamping actuation means (D) is adapted to actuate the valve opening member (66) toward the second end side against said return spring (67).

5. A spring clamp as set forth in claim 4, wherein said communication passage (14) and said check valve chamber (57) are disposed in an annular arrangement about the axis of the piston (11).

6. A spring clamp as set forth in claim 4, wherein an annular unclamping input member (63) adapted to be actuated by said unclamping actuation means (D) is liquid-tightly slidably provided between the first end portion of the actuation member (B) and the first end wall (10a) of the cylinder (10), the unclamping input member (63) is resiliently urged toward the first end side by means of said return spring (67), said check valve opening member (66) is fixedly secured to the second end portion of said input member (63), and a butting gap (M) defined between said input member (63) and the unclamping input portion (69) of said operation member (B) is set at a larger value than a butting gap (N) defined between said valve opening member (66) and said check valve member (59).

7. A spring clamp as set forth in claim 4, wherein a relief valve (76) is provided in the communication passage (14) between said liquid sealing chamber (12) and said liquid supply/discharge chamber (13), said relief valve (76) comprises a relief valve seat (78) and a relief valve chamber (77) arranged in order from the second end side, and a relief valve member (79) inserted into said relief valve chamber (77) is resiliently urged onto the relief valve seat (78) by means of a relief spring (80).

8. A spring clamp as set forth in claim 7, wherein said relief valve (76) comprises the communication passage (14) and the relief valve chamber (77) both of which are disposed in an annular arrangement about the axis of the piston (11).

9. A spring clamp as set forth in claim 8, wherein said relief valve chamber (77) is disposed in series on the first end side of said check valve chamber (57), and said check valve seat (58) is disposed in the second end portion of said relief valve member (79).

10. A spring clamp as set forth in claim 4, wherein said housing (A) is adapted to be rotated at a high speed about its axis.

11. A spring clamp as set forth in claim 10, wherein a partition wall (73) for preventing a mixing between gas and liquid is projected from said check valve opening member (66) to an inner peripheral surface (10b) of the cylinder (10).

12. A spring clamp as set forth in claim 10, wherein said housing (A) is composed of a spindle (24) of a machine tool, and said actuation member (B) is composed of a drawbar (28) internally fitted into the spindle (24).

13. A spring clamp as set forth in claim 10, wherein a first groove (41) for receiving a first sealing member (46) is formed in an outer peripheral surface (11a) of said piston (11), a slide clearance (C) defined between said cylinder (10) and the piston (11) is sealed by means of said first sealing member (46), a width dimension (E) of said groove (41) is set substantially the same as a sealing width (Ww) of said sealing member (46), a total dimension obtained by summing up a depth dimension (F) of said groove (41) and said slide clearance (C) is set at a larger value than a sealing height (Wh) of said sealing member (46), and a bottom space (41c) of said groove (41) is connected in communication to said liquid sealing chamber (12), and a first end side one (41a) of both fillets (41a) (41b) of said groove (41) is enlarged so that its pushing surface (41d) projects toward the center of said groove (41), said pushing surface (41d) is brought into sealing contact with a first end side portion of an outer peripheral surface of said sealing member (46), and the sealing member (46) is pushed onto the inner peripheral surface (10b) of the cylinder (10).

14. A spring clamp as set forth in claim 13, wherein
a second groove (42) for receiving a second sealing member (45) is formed in the outer peripheral surface (11a) of said piston (11) on the first end side with respect to said first groove (41), said slide clearance (C) is sealed by means of said second sealing member (45), and a width dimension (G) of said second groove (42) is set at a larger value than a sealing width (Vw) of said second sealing member (45), and a total dimension obtained by summing up a depth dimension (H) of said second groove (42) and said slide clearance (C) is set at a smaller value than a sealing height (Vh) of said second sealing member (45).

15. A spring clamp as set forth in claim 13, wherein said first sealing member (46) is composed of an O-ring having a substantially circular cross section.

* * * * *

UNITED STATES PATENT AND TRADEMARK OFFICE
CERTIFICATE OF CORRECTION

PATENT NO. : 5,096,347

DATED : March 17, 1992

INVENTOR(S) : Kumagai et al.

It is certified that error appears in the above-identified patent and that said Letters Patent is hereby corrected as shown below:

ON THE TITLE PAGE

AT [73] ASSIGNEES:

Change "Mori Seiko Co., Ltd., Nara; Kabushiki Kaisha Kosmek, Kobe, Japan" to --Mori Seiki Co., Ltd., Nara; Kabushiki Kaisha Kosmek, Kobe, Japan--.

Signed and Sealed this

Eighth Day of June, 1993

Attest:

MICHAEL K. KIRK

Attesting Officer

Acting Commissioner of Patents and Trademarks